(12) United States Patent
Heller

(10) Patent No.: US 7,474,886 B2
(45) Date of Patent: Jan. 6, 2009

(54) MOBILE COMMUNICATION DEVICE GRACEFUL SHUTDOWN SYSTEM AND METHOD

(75) Inventor: Amit Heller, Belmont, CA (US)

(73) Assignee: IXI Mobile (R&D), Ltd. (IL)

( * ) Notice: Subject to any disclaimer, the term of this patent is extended or adjusted under 35 U.S.C. 154(b) by 0 days.

(21) Appl. No.: 10/846,179

(22) Filed: May 13, 2004

(65) Prior Publication Data

US 2005/0255894 A1    Nov. 17, 2005

(51) Int. Cl.
*H04B 1/16*    (2006.01)
(52) U.S. Cl. ............... 455/343.2; 455/343.4; 455/574; 370/311
(58) Field of Classification Search ............. 455/574, 455/127.1, 127.5, 575.2, 420, 41.2, 41.3, 455/343.2, 343.3, 343.4, 343.5, 466, 522, 455/573; 370/311; 713/320, 321, 323, 324
See application file for complete search history.

(56) References Cited

U.S. PATENT DOCUMENTS

| | | | | |
|---|---|---|---|---|
| 6,014,573 A | * | 1/2000 | Lehtonen et al. | 455/569.1 |
| 6,052,565 A | * | 4/2000 | Ishikura et al. | 455/67.11 |
| 2002/0068618 A1 | * | 6/2002 | Shoobridge | 455/574 |
| 2004/0176065 A1 | * | 9/2004 | Liu | 455/343.1 |

* cited by examiner

*Primary Examiner*—Duc Nguyen
*Assistant Examiner*—Anthony S Addy
(74) *Attorney, Agent, or Firm*—Century IP Group, Inc.; F. Jason Far-hadian, Esq.

(57) ABSTRACT

A method of gracefully shutting down a mobile device in operational relationship with one or more active components is provided. The method comprises monitoring the mobile device's status; forwarding a termination message to at least one of the active components, when it is determined that the mobile device's status is changed from a first position to a second position; and terminating operation of the at least one active component, prior to the mobile device's status changing to the second position.

17 Claims, 3 Drawing Sheets

MOBILE COMMUNICATION DEVICE GRACEFUL SHUTDOWN SYSTEM AND METHOD

BACKGROUND

1. Field of Invention

The present invention relates generally to a system and method for gracefully shutting down a mobile communication device and, more particularly, to a method for managing active components such as applications, devices and other resources associated with the mobile communication device, prior to the mobile device shutting down.

2. Copyright & Trademark Notices

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

Related Art

Mobile communication devices typically connect to a communications server to communicate voice and data over a wireless area network (WAN). Some mobile devices are also equipped with a short-range communication transceiver to establish communication connections with devices in a personal area network (PAN).

When a mobile communication device is turned off, the communication connection between the mobile device and the network devices in the WAN and the PAN is terminated. Unfortunately, the network devices have no way of determining exactly when the connection is terminated. As such, the network devices are required to wait for a threshold period to expire before they can free their resources associated with the terminated connection.

As such, the network devices are forced into a stale state, during which network and device resources are wasted. Furthermore, during this period, the status of the mobile device is also unknown. Thus, network devices that attempt to communicate with the mobile device may receive a rejection notice indicating that their attempt to communicate with the mobile device has failed.

Furthermore, when a mobile device is turned off, application software, and hardware chipsets that store and execute the software are abruptly shutdown. This disruption may adversely affect the functional integrity of the hardware and software components and the performance of the mobile device altogether; it may also result in lost or damaged data.

An improved shutdown system and method is needed that can overcome the above shortcomings by providing a mechanism that timely notifies all active components of the mobile device (whether in the form of hardware or software) of the anticipated shutdown of the mobile device. If the mobile device is connected to other devices, then a method and system is also needed to close the connections established between the mobile device and the other devices in advance, so that all communication sessions are terminated gracefully before the mobile device is shutdown.

SUMMARY

The present disclosure is directed to a wireless communication system and corresponding methods for gracefully shutting down a mobile communication terminal.

For the purpose of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested.

In accordance with one aspect of the invention, a method for gracefully shutting down a mobile communication device is provided. The method comprises monitoring the mobile device's status; forwarding a termination message to at least one of the active components, when it is determined that the mobile device's status is changed from a first position to a second position; and terminating operation of the at least one active component, prior to the mobile device's status changing to the second position.

The mobile device waits to receive an acknowledgement message from said at least one active component, prior to terminating the operation of the at least one active component. The acknowledgement message indicates that the active component has received the termination message. In accordance with some embodiments, a plurality of termination messages are forwarded to the at least one active component, prior to mobile device's status changing to the second position.

In one embodiment, the active component comprises a software application executed on the mobile device, a processor chip, a memory chip, or a communication session established between the mobile device and another device. The mobile device may be a cellular telephone, or other mobile communication device.

In another embodiment, a system for gracefully shutting down a mobile device in operational relationship with one or more active components comprises: means for monitoring the mobile device's status; means for forwarding a termination message to at least one of the active components, when it is determined that the mobile device's status is changed from a first position to a second position; and means for terminating operation of the at least one active component, prior to the mobile device's status changing to the second position.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

A computing system and corresponding computer executable methods, according to an embodiment of the present invention, facilitate and provide a method for gracefully shutting down a mobile device to prevent abrupt interruption of any open communication sessions and to prevent abrupt termination of any processes executed on the mobile device.

Numerous specific details are set forth to provide a thorough description of various embodiments of the invention. Certain embodiments of the invention may be practiced without these specific details or with some variations in detail. In some instances, features not pertinent to the novelty of the system are described in less detail so as not to obscure other aspects of the invention.

Figure 1:
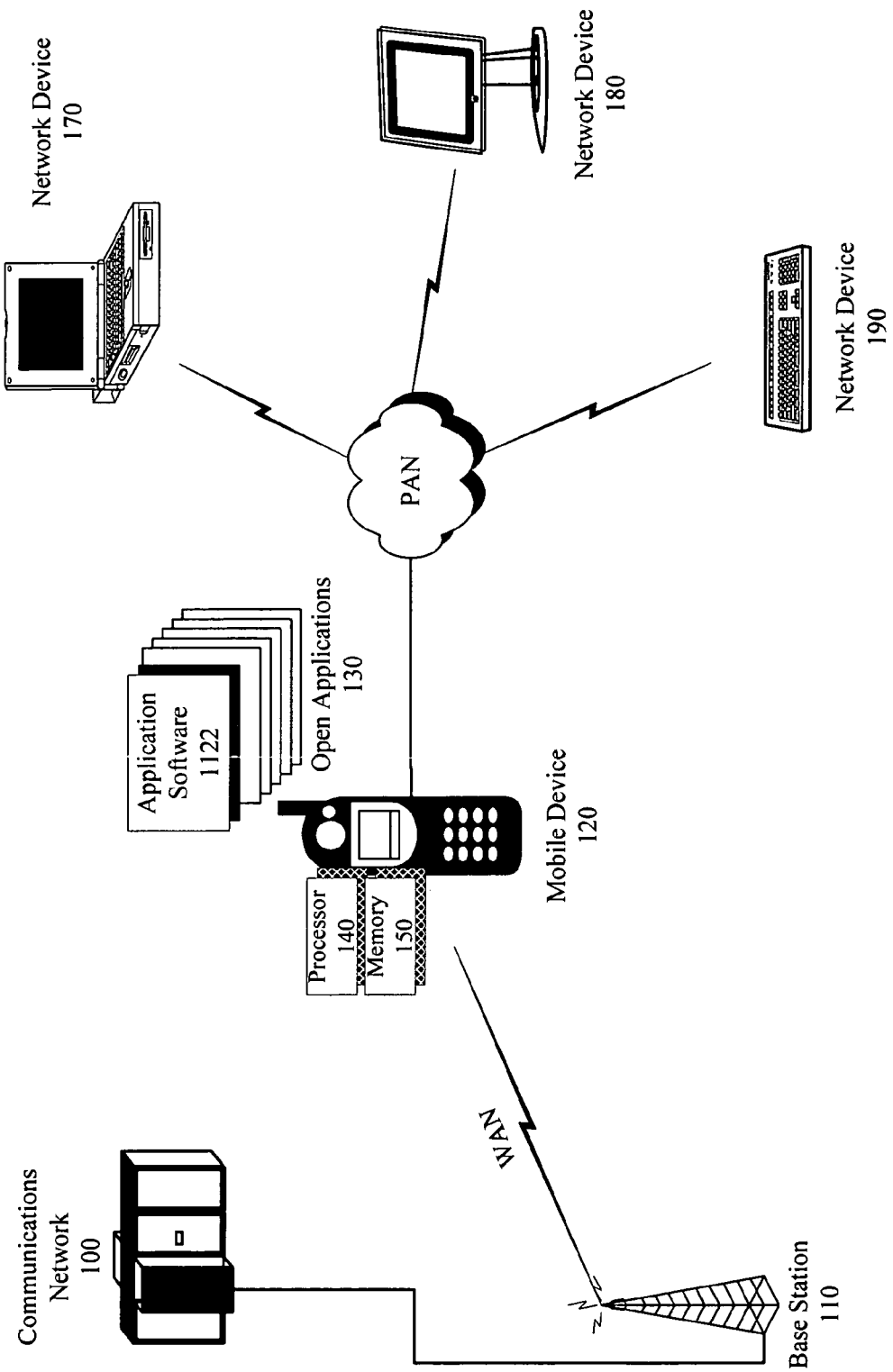
FIG. 1 is an exemplary communication environment illustrating exemplary hardware and software components associated with a mobile device, in accordance with one embodiment of the invention.

Referring to FIG. 1, in one or more embodiments of the present invention, a plurality of computing systems or devices (i.e., communications network 100, base station 110, mobile device 120, network devices 170-190, etc.) may be arranged in wired and wireless communications networks to receive and transfer information. In alternative embodiments, certain devices may be connected either wirelessly or by wire in a non-networked environment to communicate data.

In one embodiment, mobile device 120 is connected to a wireless communications network 100 by way of a base station 110, for example. The wireless communications network 100 may be supported by a cellular service provider (e.g., Sprint, AT&T, Orange, etc.). In at least one embodiment, mobile device 120 is capable of communicating with base station 110 by way of a modem chipset utilizing communications technologies such as time division multiple access (TDMA), code division multiple access (CDMA), global systems for mobile communications (GSM), general packet radio service (GPRS), wideband CDMA (WCDMA) and other well-known wireless communications technologies.

One of ordinary skill in the art will appreciate that a communications network implemented according to the present invention may advantageously be comprised of various types of networks without detracting from the scope of the invention. Such networks, for example, may comprise local area networks (LANs), wide area networks (WANs), personal area network (PAN), public, private or secure networks, value-added networks, interactive television networks, two-way cable networks, satellite networks, interactive kiosk networks, cellular communications networks, personal mobile gateways (PMGs) and/or any other suitable communications network. A more detailed description of the PMG architecture is provided in U.S. patent application Ser. No. 09/850,399, filed on May 7, 2001, the entire content of which is hereby incorporated by reference here.

In accordance with one embodiment, Mobile device 120 may comprise a transceiver to communicate with wireless devices located in close range (e.g. in a PAN). For example, network devices 170, 180, 190 can communicate with mobile device 120 as they are situated within the proximate range of mobile device 120. Mobile device 120 further comprises at least one processor 140 and memory 150. Software applications 130 may be stored in memory 150 and loaded and executed by processor 140. Open applications 130 are applications that are executed by processor 140 and are not yet terminated.

Advantageously, in certain embodiments, mobile device 120 and network devices 170-190 are equipped with low-cost, low-power, short-range radio communication interfaces, supported by well-known wireless communication protocols (e.g., Bluetooth, IEEE 802.11, etc.) As such, network devices 170-190 in the PAN can efficiently communicate with mobile device 120 and each other, so long as the devices remain within the requisite distance.

Mobile device 120, in some embodiments, is directly or through a base station 110 connected to communications network 100. In one embodiment, mobile device 120 acts as a gateway to connect the network devices 170-190 to communications network 100. Communications network 100 may comprise a public switched telephone network (PSTN), a private system (e.g., cellular system) implemented with a number of switches, wire lines, fiber-optic cable, land-based transmission towers, space-based satellite transponders, or any other suitable communication system, such as a specialized mobile radio (SMR) system.

Mobile device 120, by way of example, may be one of a mobile computing device, a personal digital assistance, a cellular phone, or other wireless mobile device capable of communicating and connecting with wireless communications network 100. Network devices 170, 180, 190, by way of example, may be a laptop computer, a monitor, a keyboard, an earpiece speaker microphone set, a personal digital assistance or other device capable of connecting and communicating with mobile device 120 over a wired or wireless communication connection, for example.

In one embodiment, a communication session is established between mobile device 120 and each of the network devices 170-190 according to a communication protocol implemented to manage data transmissions, for example, in a short-range wireless network. In a certain preferred embodiment, the short-range wireless network is implemented using Bluetooth technology and the transmission control protocol/Internet Protocol (TCP/IP). While a preferred embodiment of the invention may utilize Bluetooth and TCP/IP communication technologies, it is noteworthy that other embodiments may be implemented over any type of wired or wireless telephony or communication technology or protocol suited for the purposes of this invention.

As such, one or more or a combination of wireless and wired communication technologies suited for connecting computing devices in short-range or long-range area networks and the like may be utilized, in certain embodiments, to connect communications network 100 to mobile device 120 and network devices 170, 180, 190, for example. The terms "connected," "coupled," or any variant thereof, mean any connection or coupling, either direct or indirect, between two or more elements. The coupling or connection between the elements can be physical, logical, or a combination thereof.

In certain embodiments, application software 1122 is executed on mobile device 120, for example, to monitor open communication session and data communicated between mobile device 120 and network devices 170-190. Application software 1122 may also monitor open applications 130, processor 140 and memory 150. In some embodiments, application software 1122 is responsible for shutting down open communication sessions, open applications 130, processor 140, memory 150 and other active software or hardware components of mobile device 120.

As used herein, the terms processor, memory, mobile device, network device, base station, and communications network are to be viewed as designations of one or more computing environments that may comprise application, client or server software for servicing requests submitted by respective software applications included in devices or other computing systems connected thereto. These terms are not to be otherwise limiting in any manner. Application software 1122, for example, may comprise one or more modules that execute on one or more integrated or distributed computing environments.

Figure 2:
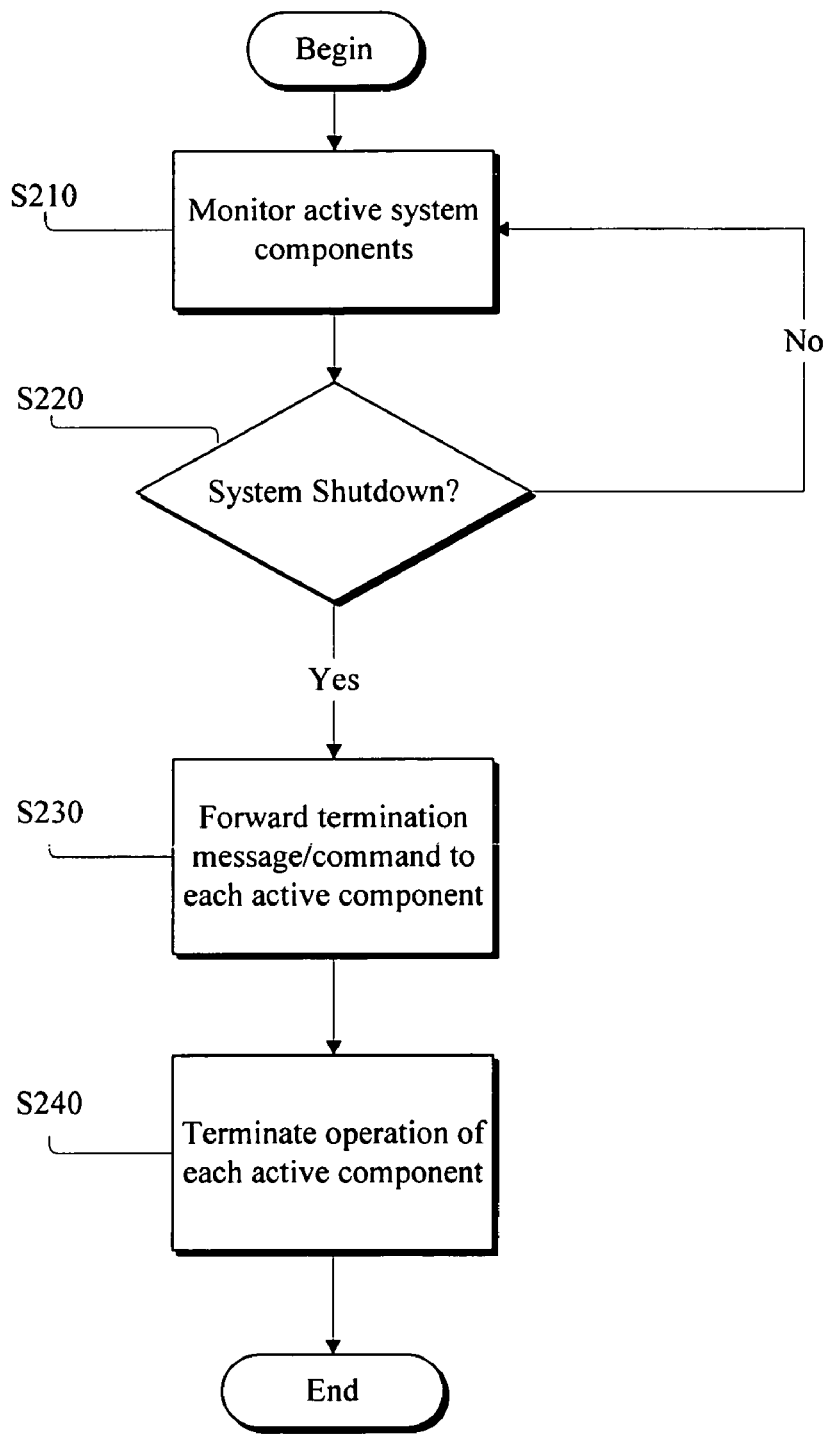
FIG. 2 is flow diagram of a method of gracefully shutting down the mobile device of FIG. 1, in accordance with one or more embodiments.

Referring to FIGS. 1 and 2, in accordance with one embodiment, application software 1122 is executed on mobile device 120 to monitor one or more active system components (S210). Active system components, for example, refer to network devices 170-190, with established open communication sessions with mobile device 120. Active system components may also comprise open applications 130, processor(s) 140, memory 150 and other operative hardware or software components of mobile device 120.

If application software 1122 detects that mobile device 120 is being shutdown (S220), then application software 1122 forwards a termination message (or termination command) to each active component (S230) prior to mobile device 120 shutting down. In this manner, application software 1122 notifies or shuts down all active system components, so that the active components discontinue operating or communicating with mobile device 120.

Accordingly, the operation of one or more active components is terminated based on the instructions included in the termination message forwarded by application software 1122 (S240). In response to receiving the termination message, for example, one or more or all open communication sessions established between network devices 170-190 and mobile device 120 are closed; one or more or all active processor or memory chips 140 and 150 are respectively shutdown; and one or more or all open applications 130 are terminated gracefully.

In one embodiment, resources allocated to network devices 170-190's open communication sessions are freed after each session is closed, so that other processes or applications executing on network devices 170-190 can use the resources that have become available. As such, forwarding a termination message to each network device 170-190, in advance of mobile device 120 shutting down prevents data loss or indefinite allocation of resources to a session that has lost its connection with mobile device 120.

Similarly, in one embodiment, a termination notification is forwarded to communications network 100, so that devices connected to communications network 100 can detect that mobile device 120 is no longer available, and thereby discontinue communicating with mobile device 120. For example, in a short or instant messaging environment, devices connected to communications network 100 may be notified that mobile device 120 has shutdown by way of a user interface audio or visual signal.

In some embodiments, open applications 130 are terminated in response to application software 1122 issuing a termination command. As such, resources such as memory 140, or processor 150 allocated to loading and executing logic code associated with applications 130 are freed as applications 130 are gracefully shutdown. Further, hardware chipsets and mechanisms associated with processor 140 and memory 150 are powered off gracefully. Memory 150 may for example comprise volatile or non-volatile memory or a hard drive for loading and storing data. Gracefully shutting down these hardware components will avoid any possible data loss or damage that can be associated with an unexpected shutdown of said hardware and software components.

The shutdown process for each active component may take place in various manners, depending on implementation. Here exemplary methods and embodiments have been disclosed. One skilled in the art would understand, however, that other implementations are also possible. The above-provided exemplary methods may be utilized either individually or in combination to accomplish the designated tasks.

For example, in certain embodiments, application software 1122 may prevent mobile device 120 from shutting down, if one or more of the active components does not confirm the receipt of the termination message or command, or alternatively if an active component is not terminated. In other embodiments, application software 1122 waits for a threshold period to allow the active system components to shutdown gracefully, otherwise when the threshold expires application software 1122 will either force the remaining active components to shutdown, or will proceed with shutting down mobile device 120 regardless of the state of the active components.

In one or more embodiments, once the user interacts with mobile device 120, by for example pressing the power key, to shutdown mobile device 120, application software 1122 turns off the mobile device 120's display to give the user the impression that mobile device 120 has been turned off. After turning off the display, application software 1122 continues to monitor a graceful shutdown process for the remaining active components in the background. In other embodiments, instead of shutting down the display completely, a message may be displayed notifying the user that a graceful shutdown process is pending.

In some embodiments, the monitoring, forwarding, and other functions discussed above in relation to application software 1122 are implemented in hardware, or a combination of hardware and software. As such, although application software 1122 is disclosed as applicable to the system of the present invention, this application is by way of example and shall not be construed to limit the scope of the invention to a software solution.

Nor shall the method of the present invention be limited in application to shutdown processes that are the result of the user's manual interaction with mobile device 120. For example, the method and system of the invention may be applicable to shutdown instructions received from a remote server, or an unavoidable shutdown associated with mobile device 120's battery power reaching a minimum threshold, for example.

In embodiments of the system, mobile device 120, network devices 170-190, communications network 100, base station 110, and equivalents thereof, comprise a controlled system environment that can be presented largely in terms of hardware components and software code executed to perform processes that achieve the results contemplated by the system of the present invention. A more detailed description of such system environment is provided below with reference to FIGS. 3A and 3B.

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments of the invention.

Software environment 1120 is divided into two major classes comprising system software 1121 and application software 1122. System software 1121 comprises control programs, such as the operating system (OS) and information management systems that instruct the hardware how to function and process information. Application software 1122 is a program that performs a specific task, such as gracefully shutting down mobile device 120. In certain embodiments of the invention, system and application software are implemented and executed on one or more hardware environments, for example.

Figure 3A:
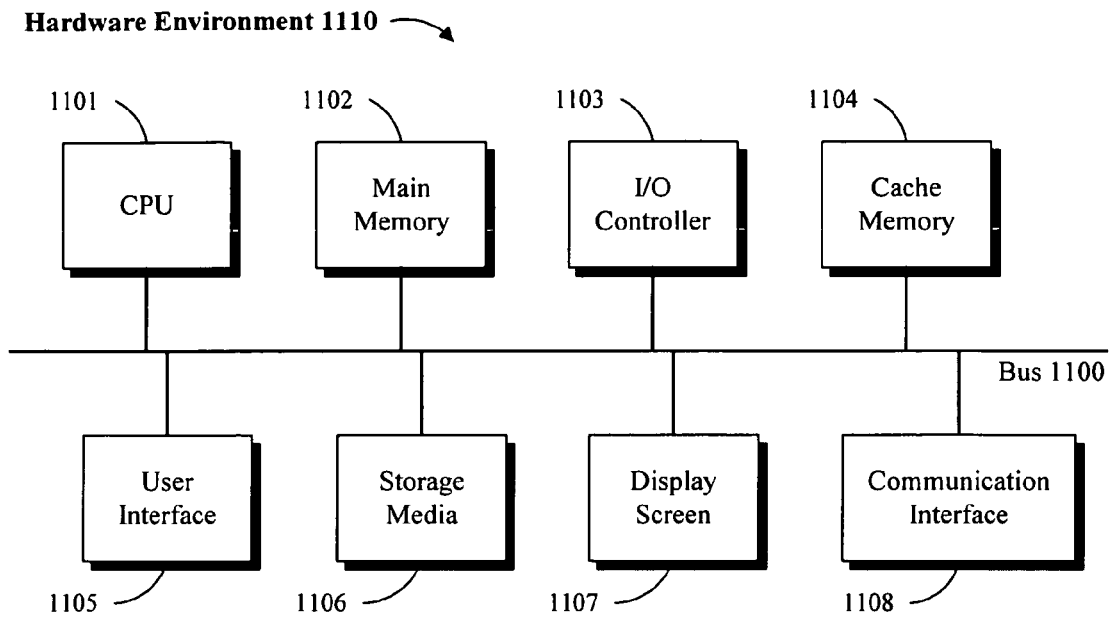
FIGS. 3A and 3B are block diagrams of hardware and software environments in which a system of the present invention may operate, in accordance with one or more embodiments.

Referring to FIG. 3A, an embodiment of the application software 1122 can be implemented as logic code in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a wireless network card, a Blue tooth port, a wireless modem, etc.), and a system synchronizer (e.g., a clock, not shown in FIG. 3A).

Cache memory 1104 is utilized for storing frequently accessed information. A communication mechanism, such as a bi-directional data bus 1100, can be utilized to provide for means of communication between system components. Hardware Environment 1110 is capable of communicating with local or remote systems connected to a wireless communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 1110 may also be embodied in an embedded system such as a set-top box, a personal data assistant (PDA), a wireless communication unit (e.g., cellular phone), or other similar hardware platforms that have information processing and/or data storage and communication capabilities. For example, in one or more embodiments of the system, hardware environment 1110 may comprise a PMG unit or an equivalent thereof.

In embodiments of the system, communication interface 1108 can send and receive electrical, electromagnetic, or optical signals that carry digital data streams representing various types of information including program code. If communication is established via a communications network, hardware environment 1110 may transmit program code through the network connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are memory cards, CD-ROM disks, ROM cards, floppy disks, magnetic tapes, computer hard drives, and network server systems.

In one or more embodiments of the invention, processor 1101 is a microprocessor manufactured by Motorola, Intel, or Sun Microsystems Corporations, for example. The named processors are for the purpose of example only. Any other suitable microprocessor, microcontroller, or microcomputer may be utilized.

Figure 3B:
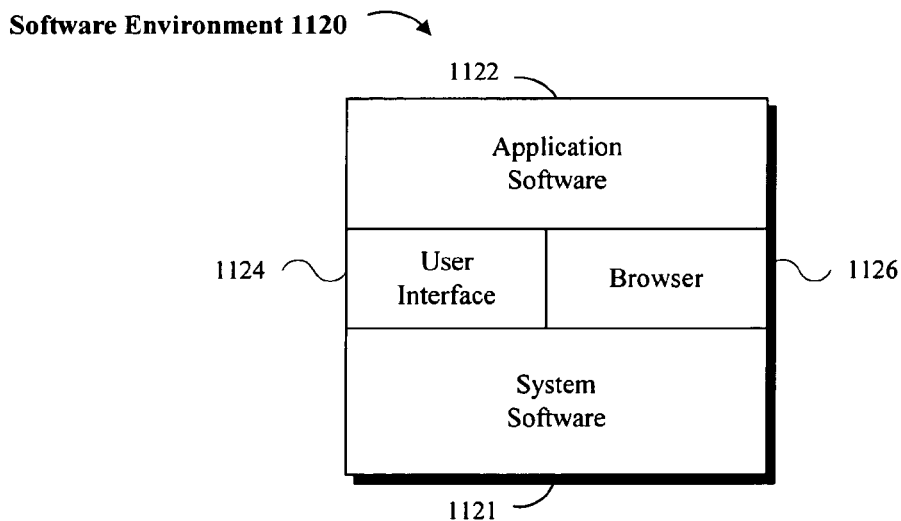

Referring to FIG. 3B, software 1120 or one or more of its components is stored in storage media 1106 and is loaded into memory 1102 prior to execution. Software environment 1120 comprises system software 1121 and application software 1122. Depending on system implementation, certain aspects of software environment 1120, and particularly application software 1122, can be loaded on one or more hardware environments 1110, or subcomponents thereof.

System software 1121 comprises software such as an operating system that controls the low-level operations of hardware environment 1110. Low-level operations comprise the management of the system resources such as memory allocation, file swapping, and other core computing tasks. In one or more embodiments of the invention, the operating system can be Nucleus, Microsoft Windows, Macintosh OS, or Linux. However, any other suitable operating system may be utilized.

Application software 1122 can comprise one or more computer programs that are executed on top of system software 1121 after being loaded from storage media 1106 into memory 1102. In a client-server architecture, application software 1122 may comprise client software and/or server software. Referring to FIG. 1, for example, in one embodiment of the invention, client software is executed on network devices 170-190 and server software is executed on mobile device 120 or mobile device 120.

Software environment 1120 may also comprise web browser software 1126 for accessing content on a remote server. Further, software environment 1120 may comprise user interface software 1124 (e.g., a Graphical User Interface (GUI)) for receiving user commands and data. The received commands and data are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods for gracefully shutting down a mobile device 120. In this exemplary embodiment, logic code for performing these methods is implemented in the form of, for example, application software 1122. The logic code, in one embodiment, may comprise one or more modules that are executed by one or more processors in a distributed or non-distributed communication model. For example, one or more embodiments of the present invention may comprise separate radio and baseband modules, or alternatively modules incorporating the radio, baseband, micro-controller and flash memory in a single-chip solution.

It should also be understood that the programs, modules, processes, methods, and the like, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure.

The methods of the present invention may be performed in either hardware, software, or any combination thereof. In particular, some methods may be carried out by software, firmware, or macrocode operating on a single computer a plurality of computers. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A method for gracefully shutting down a mobile device, the method comprising:
   monitoring the mobile device's status as to whether the mobile device is being fully powered off;
   forwarding from the mobile device a first termination message to at least one network device when it is determined that the mobile device is being fully powered off, wherein the network device discontinues communicating with the mobile device according to instructions provided in the first termination message to prevent data loss and indefinite allocation of resources;
   forwarding from the mobile device a second termination message to at least one active component when it is determined that the mobile device is being fully powered off, wherein operation of the active component is terminated according to instructions provided in the second termination message to prevent data loss and indefinite allocation of resources; and
   fully powering off the mobile device, wherein no data loss or indefinite allocation of resources occurs in the active component, the network device, and the mobile device,
   wherein the mobile device connects the network device, which is in a personal area wireless communication network, to a wireless area network so that the network device can communicate with devices in the wireless area network; and wherein the active component comprises a software or hardware module in communication with the mobile device.

2. The method of claim 1, wherein the active component comprises a software application executed on the mobile device.

3. The method of claim 1, wherein the active component comprises a processor chip.

4. The method of claim 1, wherein the active component comprises a memory chip.

5. The method of claim 1, wherein the active component comprises a communication session established between the mobile device and another device.

6. The method of claim 1, further comprising:
   waiting to receive an acknowledgement message from said at least one active component or network device, prior to terminating the operation of the at least one active component.

7. The method of claim 1, further comprising:
   forwarding a plurality of termination messages to the at least one active component or network device, prior to mobile device being fully powered off.

8. The method of claim 7, wherein the acknowledgement message indicates that the active component or the network device has received the termination message.

9. The method of claim 1, wherein the mobile device is a cellular telephone.

10. The method of claim 1, wherein the first termination message instructs the network device to shutdown.

11. The method of claim 10, wherein the network device forwards an acknowledgement message to the mobile device upon receipt of the first termination message.

12. A system for gracefully shutting down a mobile device, the system comprising:
   means for monitoring the mobile device's status as to whether the mobile device is being fully powered off;
   means for forwarding from the mobile device a first termination message to at least one network device when it is determined that the mobile device is being fully powered off, wherein the network device discontinues communicating with the mobile device according to instructions provided in the first termination message to prevent data loss and indefinite allocation of resources;
   means for forwarding from the mobile device a second termination message to at least one active component when it is determined that the mobile device is being fully powered off, wherein operation of the active component is terminated according to instructions provided in the second termination message to prevent data loss and indefinite allocation of resources; and
   means for fully powering off the mobile device, wherein no data loss or indefinite allocation of resources occurs in the active component, the network device, and the mobile device,
   wherein the mobile device connects the network device, which is in a personal area wireless communication network, to a wireless area network so that the network device can communicate with devices in the wireless area network; and wherein the active component comprises a software or hardware module in communication with the mobile device.

13. The system of claim 12, wherein the active component comprises a software application executed on the mobile device.

14. The system of claim 12, wherein the active component comprises a processor chip.

15. The system of claim 12, wherein the active component comprises a memory chip.

16. The system of claim 12, wherein the active component comprises a communication session established between the mobile device and another device.

17. The system of claim 12, further comprising:
   means for receiving an acknowledgement message from said at least one active component or network device, prior to terminating the operation of the at least one active component.

* * * * *